July 20, 1965  J. R. CASSANO ETAL  3,195,673
VEHICLE ROAD SPEED CONTROL MECHANISM
Filed July 31, 1963  2 Sheets-Sheet 1

INVENTORS
James R. Cassano
William E. Fritz
BY
D. D. McGraw
THEIR ATTORNEY

July 20, 1965   J. R. CASSANO ETAL   3,195,673
VEHICLE ROAD SPEED CONTROL MECHANISM
Filed July 31, 1963   2 Sheets-Sheet 2
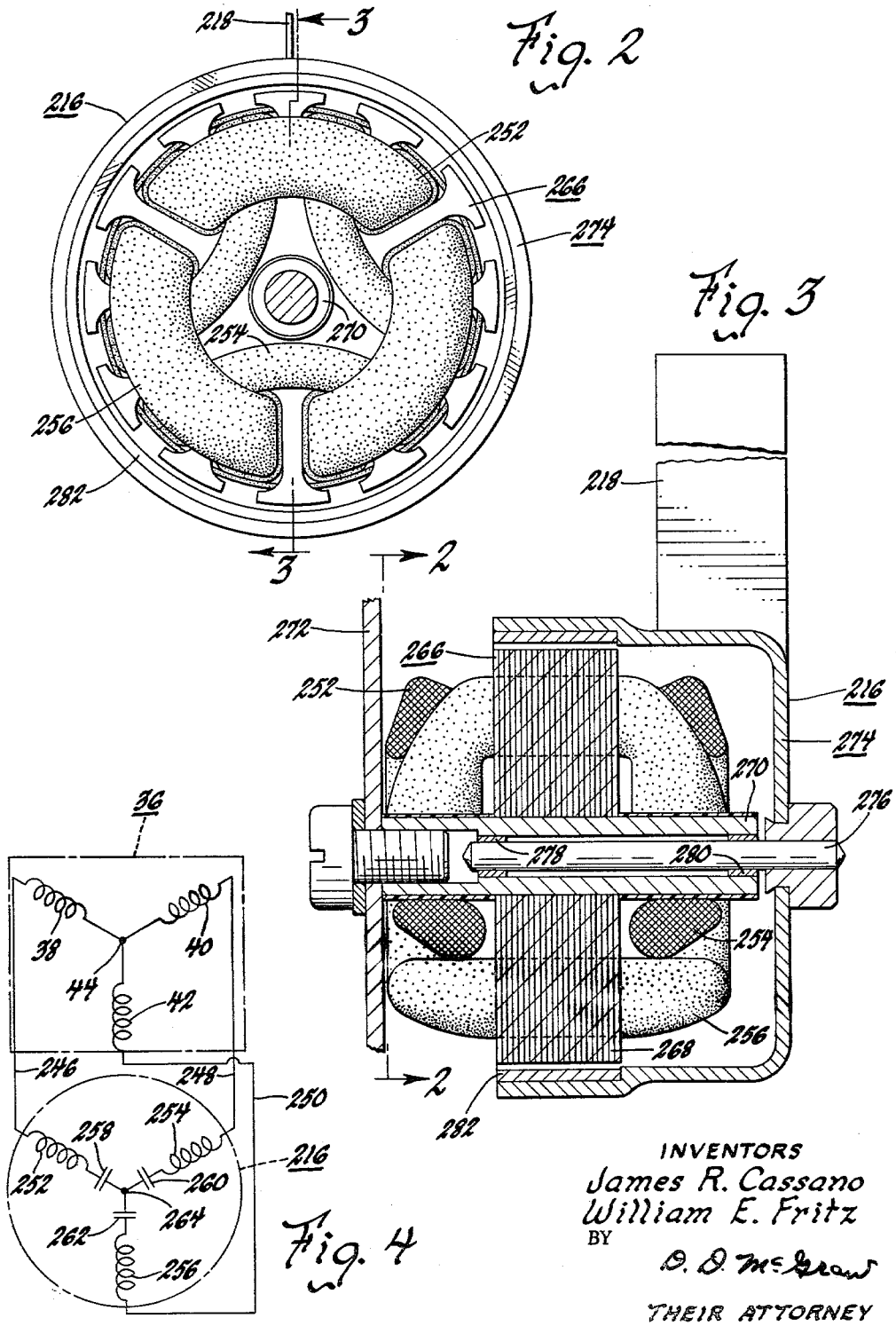
INVENTORS
James R. Cassano
William E. Fritz
BY
D. D. McGraw
THEIR ATTORNEY

United States Patent Office 3,195,673
Patented July 20, 1965

3,195,673
VEHICLE ROAD SPEED CONTROL MECHANISM
James R. Cassano and William E. Fritz, Rochester, N.Y., assignors to General Motors Corporation, Detroit, Mich., a corporation of Delaware
Filed July 31, 1963, Ser. No. 299,037
5 Claims. (Cl. 180—82.1)

The invention relates to a mechanism for controlling the speed of a motor vehicle at a desired speed under varying road load conditions, and more particularly to a mechanism which is powered by fluid pressure such as engine intake manifold vacuum and atmospheric air and is controlled by a vehicle speed responsive signal. The system embodying the invention is particularly concerned with the utilization of an electric speedometer transmitter and a hysteresis actuator which utilizes the magnetic hysteresis of magnetic material therein to develop a torque. In such a speed control mechanism it is desirable to use the engine intake manifold vacuum and atmospheric air as differential pressures which operate on opposite sides of a servomotor power wall in accordance with variations in actual vehicle speed from a reference vehicle speed to move the vehicle engine throttle valve so as to maintain the actual vehicle speed substantially equal to the reference vehicle speed. In order to accomplish this result, it is necessary to sense the actual vehicle speed and the desired vehicle speed and compare the two to provide a control output which controls the fluid pressures in the servomotor. It is also desirable to have various vehicle operator operable controls to provide adequate safeguards and proper mechanism operation. Such controls may include means for rendering the fluid pressure portion of the system completely inoperative to control the engine throttle, other means which must be actuated to condition the fluid pressure system for operative control of the engine throttle, means for setting the reference speed, means for returning control of the engine throttle valve to the manual control condition upon application of the vehicle brakes, and in some instances means for conditioning the system for operation upon the attainment of the reference speed by the vehicle.

In the drawings:

FIGURE 2 is an end view of the hysteresis actuator utilized in the mechanism of FIGURE 1, having parts broken away and in section and taken in the direction of arrows 2—2 of FIGURE 3.

FIGURE 3 is a cross section view with parts broken away of the actuator of FIGURE 2 taken in the direction of arrows 3—3 of that figure.

FIGURE 4 is a schematic electrical diagram of the portion of the mechanism of FIGURE 1 generating the vehicle speed signal and the actuator receiving the signal.

Figure 1:
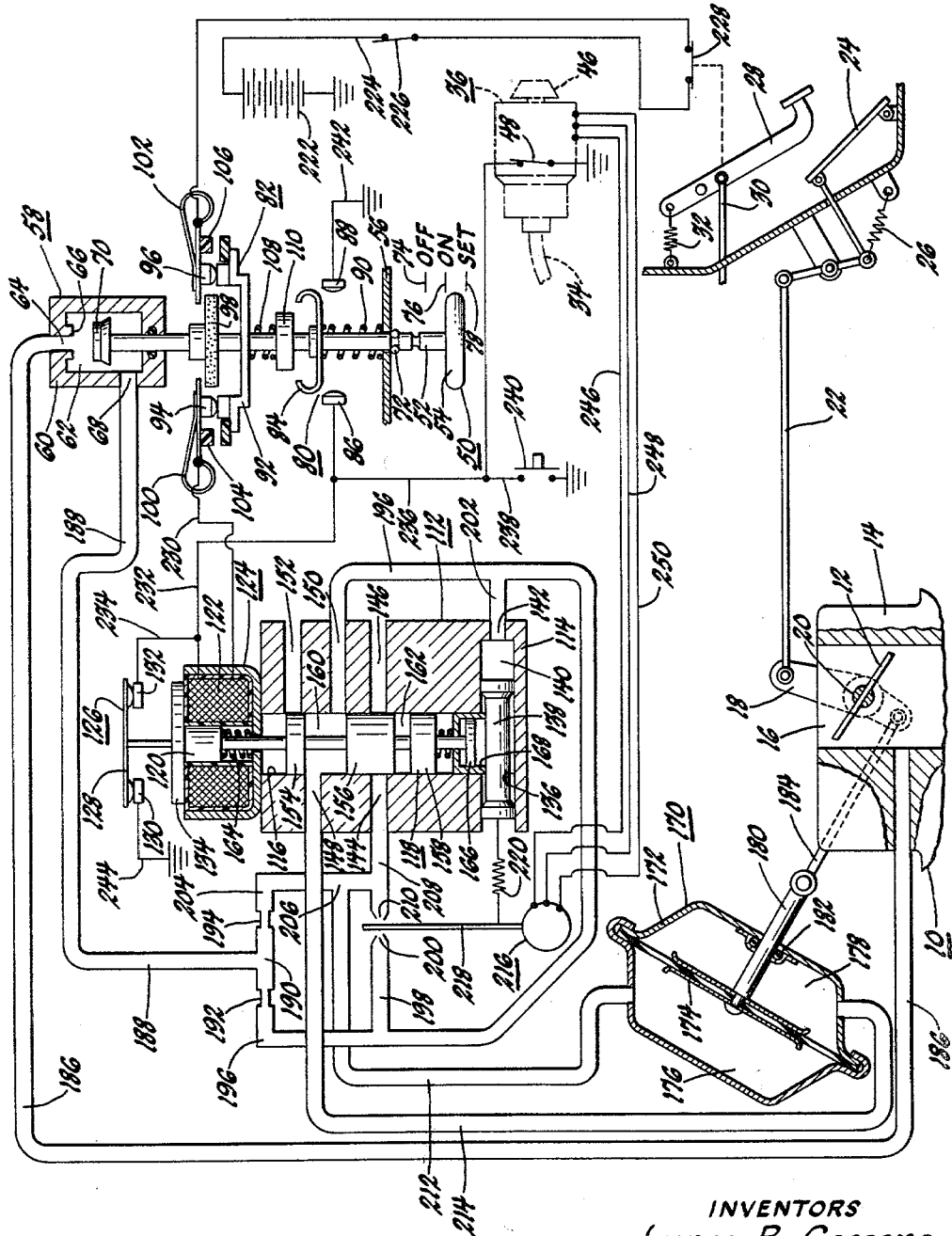
FIGURE 1 is a schematic presentation of a system embodying the invention having some elements thereof illustrated with parts broken away and in section.

The system shown in FIGURE 1 is utilized in a vehicle powered by an engine 10, the speed and power of which are controlled by the position of the throttle valve 12 in the engine carburetor 14. The carburetor passage 16 is connected to the engine intake manifold and the pressure in passage 16 beyond the throttle valve 12 is referred to as engine intake manifold vacuum. Throttle valve 12 is schematically illustrated as being moved by an arm 18 mounted to the throttle valve shaft 20. Suitable throttle control linkage 22 is connected with the accelerator pedal 24 so that the operator can manually open the throttle valve 12 by pressing down on the pedal. The throttle valve return spring 26 is suitably provided so as to urge the throttle valve 12 toward the zero throttle position when the accelerator pedal 24 is released. The brake pedal 28 is also under control of the vehicle operator and actuates the vehicle brake system through the push rod 30. Pedal 28 is returned to the brake release position by the pedal return spring 32.

The vehicle in which the system is installed is provided with a speedometer cable 34 which is driven in accordance with the vehicle road speed. Cable 34 drives the speedometer 36 which generates a three phase electric current controlling the speedometer speed indicating needle which may be suitably provided as a part of the speedometer. The speedometer 36 may have a three phase Y-connected winding for generating this current. The winding is schematically shown as a part of FIGURE 4 and includes the coils 38, 40 and 42 which are Y-connected at 44. In addition, the speedometer 36 is provided with a reference speed set knob 46 which positions a switch 48 so that the switch is closed when the vehicle actual speed attains the reference speed set by means of knob 46. Any suitable mechanism which is actuatable by a rotating element or other means sensitive to vehicle speed may be used to open and close the switch 48. Such mechanism are well known to those skilled in the art and are, therefore, not further described.

A manual control mechanism 50 is provided for manual operation by the vehicle operator. It includes a rod 52 with knob 54 on one end thereof. Rod 52 is reciprocably mounted in the control mechanism housing wall 56 and extends into the valve assembly 58. Assembly 58 is schematically illustrated as including a housing 60 defining a chamber 62 having a vacuum inlet 64 surrounded by a valve seat 66 and a vacuum outlet 68 connected to chamber 62. A valve 70 is provided on the end of rod 52 extending into chamber 62 and the rod is reciprocably movable to open and close the valve relative to the valve seat 66. A spring detent 72 may be suitably provided relative to rod 52 so that it engages grooves in the rod to hold the valve 70 in the open position, as shown in the drawing, or in the closed position. Valve 70 is seated on seat 66 when the knob 54 occupies the "off" position 74 and is unseated when occupying the "on" position 76, as illustrated in the drawing, or the "set" position 78. Movement of rod 52 also controls switches 80 and 82. Switch 80 includes a bridge element 84 mounted on rod 52 and a pair of contacts 86 and 88 which are engageable by the bridge element 84 only when the rod 52 is moved to the "set" position 78. A spring 90 acts against the housing wall 56 and bridge 84 urging the bridge away from its contacts 86 and 88. Since no groove for spring detent 72 is provided when the knob 54 is in the "set" position, bridge 84 can close contacts 86 and 88 against the force of spring 90 only so long as the operator manually holds the knob 54 at the "set" position 78. When the knob 54 is released from the "set" position spring 90 will move the rod 52 to the "on" position shown in the drawing.

Switch 82 includes a bridge 92 mounted on rod 52 and electrical contacts 94 and 96 which are engageable by the bridge when the knob 54 is in either the "on" or "set" position. When the knob is pushed to the "off" position, a plate 98 on rod 52 moves contacts 94 and 96 against the contact biasing springs 100 and 102, respectively while the bridge extreme ends engage stops 104 and 106. Bridge 92 then moves against the spring 108 acting against a collar 110 secured to rod 52, and contacts 94 and 96 are disengaged from the bridge. Spring detent 72 will engage a groove in the rod 52 to hold the rod in the "off" position 74, thus holding both switches 80 and 82 open and valve 70 seated against seat 66.

The system of FIGURE 1 also includes a conditioning valve and reference speed setting asesmbly 112. This assembly includes a housing 114 having valve bore 116 formed therein. A valve 118 is reciprocably received in bore 116 and has one end 120 extending into the coil 122 of the electromagnet 124 which may also be a core for that coil. A holding switch 126, comprising a bridge 128 and contacts 130 and 132, is actuated when the electromagnet 124 is energized so as to engage the bridge with the contacts and close the switch. An armature 134 may be secured to the valve end 120 so as to provide more positive valve actuation under influence of the electromagnet 124, or to permit the valve to be made of non-magnetic material.

Housing 114 has a transverse bore 136 intersecting one end of bore 116. Reference speed piston 138 is reciprocably received in bore 136 so that one end of the piston cooperates with one end of the bore to define a chamber 140. Port 142 is connected to chamber 140. Housing 114 is also provided with ports 144 and 146 which intersect bore 116 in such alignment that valve 118 can connect and disconnect these ports by movement in bore 116. Ports 148, 150 and 152 are also provided in housing 114 and intersect bore 116 in staggered relation. Valve 118 has spaced lands 154, 156 and 158 formed thereon and smoothly fitting in bore 116 so as to define chamber 160 between lands 154 and 156, and chamber 162 between lands 156 and 158. When electromagnet 124 is deenergized, the spring 164 acting against the valve end 120 moves the valve upwardly to open holding switch 126 and to position the valve chamber 160 so that port 152 is connected to port 148 through that chamber. Land 156 then closes port 150 and chamebr 162 interconnects ports 144 and 146. Ports 146 and 152 are connected with atmospheric air and therefore in this condition ports 144 and 148 are also connected to atmosphere. The lower end 166 of valve 118 is provided with a spring biased holding cup 168 which is held in a disengaged position in relation to reference speed piston 138 when electromagnet 124 is deenergized.

When electromagnet 124 is energized, holding switch 126 is closed to hold the electromagnet energized, subject to switch 82 and others to be described, and valve 118 is moved to the position shown in the drawing. In this condition the atmospheric port 152 is closed by land 154, atmospheric port 146 is closed by land 156, as is port 144, and ports 148 and 150 are interconnected through chamber 160. Cup 168 also engages the portion of reference speed piston 138 which passes through the end of bore 116 and holds piston 138 in the position that it occupied at the time the electromagnet was energized.

A servomotor 170 is provided for power operation of the throttle valve 12. The servomotor includes a housing 172 having a power wall 174 therein dividing the housing into chambers 176 and 178. An actuating rod 180 is attached to the power wall 174 and extends through a suitable seal 182 formed in housing 172 in that portion of the housing forming a part of chamber 178. Suitable linkage 184 connects rod 180 to an extension of throttle linkage arm 18 so that movement of power wall 174 to extend rod 180 from housing 172, by providing a pressure differential across the power wall with the higher pressure being in chamber 176, causes the throttle valve to be urged toward the zero throttle valve position.

The fluid pressure portion of the speed control mechanism includes the engine intake manifold passage 16, the valve assembly 58, the valve assembly 112, and the servomotor 170. It also includes various conduits and other control mechanism described below. A raw engine intake manifold vacuum conduit 186 connects passage 16 to the vacuum inlet 64 of valve assembly 58. A second raw engine intake manifold vacuum conduit 188 connects vacuum outlet 68 to the conduit T 190. Restrictions 192 and 194 are provided on opposite arms of the T 190. Conduit 196 is connected to restriction 192 at one end and to port 150 of housing 114 at the other end. Intermediate the ends of conduit 196 are a conduit 198 having T connection therewith and having an open end terminating in an orifice 200, and a conduit 202 intermediate the connection of coduit 198 and port 150 and also T connected to conduit 196. Conduit 202 leads to port 142 of housing 114.

A conduit 204 is connected with restriction 194. Conduit 204 is connected to one of the three arms of a T connection 206 with another arm thereof being connected to conduit 208, which is in turn connected to port 144 of housing 114 at one end and has an atmospheric air inlet orifice 210 positioned in a spaced opposed relation to orifice 200. The third arm of T 206 connects with conduit 212 which leads to the servomotor chamber 176. A conduit 214 connects ports 148 of housing 114 to servomotor chamber 178. A hysteresis actuator 216, which is shown in greater detail in FIGURES 2, 3 and 4, is provided with an orifice control air vane 218 positioned between orifices 200 and 210. A tension spring 220 is attached to vane 218 and to reference speed piston 138 so that it urges vane 218 to a position wherein it will close orifice 210.

The electrical system forming a portion of the speed control mechanism, in addition to including those electrical components earlier described, has a source of direct current electrical energy schematically illustrated as the battery 222 connected by electrical lead 224 through the ignition switch 226 and the normally closed brake operated switch 228 to contact 96 of switch 82. Switch 228 opens when the vehicle operator actuates the brake pedal 28, thereby opening the electrical circuit from battery 222. Contact 94 of switch 82 is connected through electrical lead 230 to one end of the coil 122 of electromagnet 124. The other end of coil 122 is connected through electrical lead 232 to contact 86 of switch 80. It is also connected through electrical lead 234 to contact 132 of switch 126 and through electrical lead 236 to one side of switch 48, which is controlled by speedometer 36 as earlier described. A branch 238 of electrical lead 236 is also connected to one side of a normally open switch 240, the other side of which is connected to ground. Switch 240 is an auxiliary set switch which may be foot actuated by the vehicle operator. It is in parallel to switch 48, which has the side opposite lead 236 connected to ground. Switch 48 is also a normally open switch and is closed when the desired vehicle speed is attained by the vehicle. Contact 88 of switch 80 is connected to ground through electrical lead 242 and contact 130 of switch 126 is connected to ground through electrical lead 244. Hysteresis actuator 216 is connected to the speedometer signal transmitter section of speedometer 36 through three electrical leads 246, 248 and 250. A more detailed disclosure of the connection of these elements is found in FIGURE 4.

The hysteresis actuator is mechanically illustrated in FIGURES 2 and 3 and schematically illustrated in FIGURE 4. The schematic illustration shows the three stator windings 252, 254 and 256. The outer ends of these stator windings are respectively connected to electrical leads 246, 248 and 250, while the inner ends are respectively connected to capacitors 258, 260 and 262, the other sides of which are in turn Y-connected at 264. Lead 246 is connected to the outer end of coil 38 of the speedometer 36, lead 248 is connected to the outer end of coil 40, and lead 250 is connected to the outer end of coil 42.

The hysteresis actuator 216 is provided with an inside stator 266 comprised of a distributed four pole three phase Y-connected winding system formed by the stator windings 252, 254 and 256. The windings are in twelve slots formed in the laminations 268. The stator therefore is very much like a standard rotor, except that the laminations 268 are mounted on the stationary support 270, which is in turn attached to the actuator mounting bracket 272. A cup shaped rotor 274 is supported over the stator 266 on shaft 276, which is journalled in bearings 278 and 280 in support 270. Rotor 274 has an internally mounted ring 282 of magnetic material, referred to as the hysteresis material, so that there is a slight air gap between the stator laminations 268 and the ring 282. Since the stator windings are connected to the three phases of the speedometer transmitter 36, a revolving field results. The hysteresis rotor 274 tends to follow this field and supplies a torque which is proportional to the current in the stator. The air vane 218 is secured to the rotor 274 so that this torque is transmitted to the vane. The voltage of the three phase current delivered to the hysteresis actuator through leads 246, 248 and 250 from the speedometer 36 is nearly constant and is independent of speed frequencies. However, at higher frequencies the inductive impedance of the stator increases so that with rising frequency a falling current and consequently a falling torque tends to result. In order to obtain a rising torque with frequency, the three capacitors 258, 260 and 262 are provided in series with the windings 252, 254 and 256, respectively. By selecting the right size capacitors a rising current with rising frequency can be obtained so that the torque output of the actuator 216 rises with vehicle speed. The portion of the torque curve which is utilized in the mechanism, for the frequencies used, is substantially linear.

FIGURE 1 shows the entire system conditioned for speed controlling action of the vehicle at a set speed with the vehicle operating at that speed. When the system is to be rendered completely inoperative, the operator pushes knob 54 to the "off" position. Spring detent 72 holds the knob in this position. Switch 82 is open since plate 98 moves to engage the arms on which contacts 94 and 96 are mounted and to pivot the contacts against the force of springs 100 and 102. The stops mounted on the ends of bridge 92 engage the stops 104 and 106 to prevent movement of the bridge from following movement of the contacts 94 and 96, thereby opening the switch. Switch 80 is also open when the knob 54 is in the "off" position, and valve 70 is seated against the valve seat 66. Electromagnet 124 is deenergized so that spring 164 has moved valve 118 upwardly, holding switch 126 open. Port 148 is connected to port 152 and disconnected from port 150 in the valve housing. Port 144 is connected at port 146, and the holding cup 168 is moved to release the reference speed piston 138. Raw engine intake manifold vacuum is in conduit 186 but not beyond the valve seat 66. Thus the remaining portion of the fluid pressure system is at atmospheric pressure, including chambers 176 and 178 of the servomotor 170. Therefore, the servomotor offers no resistance to manual control of the throttle valve 12 by movement of the accelerator pedal 24.

When the operator pulls the knob 54 outwardly to the "on" position 76, spring detent 72 holds the knob in that position, as shown in FIGURE 1. At this time switch 82 is closed while switch 80 remains open. Valve 70 is unseated from valve 66, and raw engine intake manifold vacuum therefore exists in chamber 62 of valve assembly 58, in conduit 188 and in T 190. Since valve 118 is still in the same position as before due to continued deenergization of electromagnet 124, atmospheric pressure is present in conduits 212 and 214 and therefore in servomotor chambers 176 and 178. Vacuum is present in conduit 196, modified by the air bleed orifice 200, thus providing a modified vacuum condition sensitive to vehicle speed in conduit 196, conduit 198, and vacuum chamber 140. This speed modified vacuum, acting on reference speed piston 138 on one end and with atmospheric pressure acting on the piston in the other end, moves the piston to the right and exerts a force on the air vane 218 through spring 220. In the meantime the speed of the vehicle generates the three phase speed signal in the speedometer 36 and delivers the signal through electrical lads 246, 248 and 250 to the hysteresis actuator 216. The torque output of the actuator 216 tends to move the air vane 218 counterclockwise, as seen in FIGURE 1, against the force exerted through spring 220 by piston 138. Thus at low vehicle speeds there is insufficient torque to overcome a force exerted through spring 220 and the air vane 218 will keep air inlet orifice 210 fully closed and air inlet orifice 200 fully open.

When the operator increases the vehicle speed further, a force is exerted by actuator 216 to move vane 218 counterclockwise and the vane commences modulation of orifices 200 and 210. Since orifice 200 is being closed more than before, the effective vacuum in conduit 196 will therefore increase in chamber 140, urging piston 38 further to the right and exerting a greater force on vane 218 tending to open orifice 200. Thus the vane 218 is balanced by the piston 138.

When the vehicle has reached the speed set into the system by knob 46, switch 48 is closed. This energizes electromagnet 124 through switch 82, brake switch 228, and ignition switch 226. Valve 118 is moved downwardly against the force of spring 164, and switch 126 is closed to hold the electromagnet energized without further regard to the opening and closing of switch 48. The same effect can be acomplished by the vehicle operator by closing the foot actuated switch 240 or the manually actuated switch 80.

Movement of valve 118 places the valve assembly 112 in the position shown in FIGURE 1 so that the speed modified vacuum in conduit 196 is connected to conduit 214 and to chamber 178 of the servomotor 170. At the same time, with port 144 closed by valve land 156, a modified vacuum condition exists in conduit 212 and servomotor chamber 176. Thus the vacuum in chamber 178 may be considered as a plus speed modified vacuum signal and the vacuum in servomotor chamber 176 may be considered as a minus speed modified vacuum signal. It is noted that the reference speed piston 138 is held in position by holding cup 168 upon energization of electromagnet 124, thus no longer varying the position of that piston with speed changes. Therefore movement of vane 218 acts to expand and contract spring 220 due to the amount of torque exerted thereon by hysteresis actuator 216. The actual vehicle speed signal given actuator 216 is therefore compared to the reference speed signal as provided by the immovable piston 138 to modulate the air entering orifices 200 and 210. The amount of air entering orifice 210 is increased in direct relation to an increase in speed while the amount of air entering orifice 200 is increased in inverse relation to an increase in speed. Thus the modulation control of orifices 200 and 210 is an inversely proportional relationship.

If, for example, the vehicle increases above the set speed, or the speed at which the vehicle was traveling when either switch 240 or switch 80 was actuated, vane 218 moves counterclockwise to permit less air to enter the orifice 200 and more air to enter orifice 210. The absolute pressure level thus decreases in conduit 196 and therefore in chamber 178 and increases in conduit 212 and servomotor chamber 176. This causes the power wall 174 to move toward the throttle valve closing position, thus decreasing the vehicle speed. This speed change is in turn sent back through the speedometer 36 to the hysteresis actuator 216 and the reverse tendency occurs. The system will balance out when the actual speed matches the reference speed set by locking piston 138 into position.

A decrease in vehicle actual speed results in a decrease in atmospheric air entering orifice 210 and an increase in atmospheric air entering orifice 200. This changes the pressure balance across the power wall 174 so that throttle valve 12 is opened to furnish more power to the vehicle and bring the actual vehicle speed back to the reference speed.

If at any time the operator desires to accelerate the vehicle beyond the reference speed, he can do so by pressing down on the accelerator pedal 24 with sufficient force to overcome the differential pressure acting on the servomotor power wall 174. However, this action will be more difficult than when the speed control system is inoperative, so that the operator is aware of the fact that he is going beyond the reference speed.

If the operator desires to disable the speed control system, he may take any of several actions. He may actuate the brake pedal 28, thus opening the normally closed brake switch 228. This will deenergize electromagnet 124, permitting spring 164 to move valve 118 upwardly and cause the fluid system to introduce air at atmospheric pressure in servomotor chambers 176 and 178. The system will not automatically reengage when the brake pedal is released since the holding switch 126 has been opened. Thus it will require the operator to again reactivate the system by taking positive action at the speed he desires to maintain. The same disabling action may be taken by the operator pushing knob 54 to the "off" position 74 to open switch 82. The same action also takes place when the ignition switch 226 is opened.

A vehicle road speed control system embodying the invention permits the operator to condition the system to maintain the vehicle at a preset speed upon attainment of the speed, or at any speed at which the vehicle may be traveling when the operator manually energizes the system. The system may be disabled either manually or by vehicle brake operation.

In the claims:

1. A vehicle road speed maintaining control comprising; a fluid pressure first system including, first and second sources of differential fluid pressure, a servomotor having a power wall and first and second fluid pressure chambers separated thereby, means for connecting said power wall to the vehicle engine throttle valve to increase and decrease vehicle speed by power movement of said power wall, first conduit means having a restrictive fluid flow connection with said first pressure source and a variable orifice connection with said second pressure source and connected to said servomotor first chamber, hysteresis actuated orifice control means including a hysteresis actuator for controlling said orifice and having reference speed means for imparting a reference speed signal to said orifice control means, second conduit means having a restrictive fluid flow connection with said first fluid pressure source and a variable orifice connection with said second fluid pressure source controlled by said orifice control means in inverse relation to control of said first conduit means orifice connection by said orifice control means and connected to said reference speed means and further connected to said servomotor second chamber, first valve means for connecting and disconnecting said first and second servomotor chambers to said second pressure source and having reference speed setting means operable to set said reference speed means concurrently with said disconnecting action, and second valve means for connecting and disconnecting said first pressure source with said first and second conduit means; a second system having a source of energy for powering said first valve means, system energizing and deenergizing control means including means for opening and closing said second valve means and for powering said first valve means from said source of energy to disconnect said first and second servomotor chambers from said second pressure source and for setting said reference speed means when said second valve means is opened; and a vehicle speed sensitive power generator for generating power as a function of vehicle speed and actuating said hysteresis actuator to control said orifice control means cooperatively with said reference speed means to control fluid pressures delivered to said servomotor chambers for maintaining a constant vehicle speed.

2. A vehicle road speed maintaining system comprising a servomotor, a source of power for said servomotor, and control means controlling the delivery of power from said source to said servomotor in accordance with a reference vehicle speed and actual vehicle speed, said control means including a hysteresis actuator generating a current base power delivery control force directly proportional to and responsive to a frequency base actual vehicle speed signal and an actual vehicle speed signal generator delivering the frequency base actual vehicle speed signal to said actuator.

3. In a vehicle road speed control system, means for controlling said vehicle in accordance with a reference speed and actual vehicle speed and comprising, means for generating an actual vehicle speed signal, means for generating a vehicle reference speed signal, and power means for driving said control means in accordance with said actual vehicle speed signal as modified by said vehicle reference speed signal, said actual vehicle speed signal being characterized as a substantially constant voltage of variable frequency and said power means comprising a hysteresis rotor and stator assembly characterized by having a torque output linearly variable with vehicle speed signal frequency throughout a normal operating vehicle speed range.

4. A vehicle road speed control system comprising, means for generating electrical signalling at a substantially constant voltage throughout a vehicle road speed controllable range at frequencies linearly variable with actual vehicle speed to provide an actual vehicle road speed signal, means for establishing a first force constituting a reference vehicle speed signal, hysteresis actuated means for receiving said actual vehicle road speed signal and generating a second force substantially linearly variable therewith, means for receiving said forces in opposed relation to establish a speed error signal, and means for receiving said speed error signal to control actual vehicle speed for maintaining substantially zero speed error.

5. A vehicle speed maintaining system comprising, means generating substantially constant voltage electrical signalling having the frequency thereof variable in accordance with actual vehicle speed throughout a vehicle road speed controllable range, means powered by said electrical signalling to generate a first force reflecting actual vehicle speed, means for establishing a second force reflecting a reference vehicle speed, a fluid pressure actuated servomotor having a movable power wall adapted to be connected to control vehicle speed and further having first and second fluid pressure chambers on opposite sides of said power wall, a first fluid circuit for establishing an overspeed modified fluid pressure in said first servomotor chamber and a second fluid circuit for establishing an underspeed modified fluid pressure in said second servomotor chamber, and fluid circuit control means responsive to said first and second forces for inversely modulating said modified fluid pressures relative to each other to maintain the actual vehicle speed substantially at the reference vehicle speed.

References Cited by the Examiner

UNITED STATES PATENTS

| | | | |
|---|---|---|---|
| 1,390,510 | 9/21 | Douglas et al. | 123—102 |
| 2,243,354 | 5/41 | Musser | 180—82.1 X |
| 2,713,335 | 7/55 | Peterson | 123—102 |
| 2,835,237 | 5/58 | Thorner | 123—102 |
| 2,972,391 | 2/61 | Faiver et al. | 180—82.1 |
| 3,062,312 | 11/62 | Dietrich et al. | 123—102 X |
| 3,070,185 | 12/62 | Fales | 123—102 X |
| 3,092,090 | 6/63 | Berninger | 180—82.1 X |

A. HARRY LEVY, *Primary Examiner.*

KENNETH H. BETTS, *Examiner.*